INVENTOR.
WARREN E. BENSON, JR.
BY
Dike, Thompson, Bronstein & Mrose
ATTORNEYS

April 19, 1966 W. E. BENSON, JR 3,247,455
APPARATUS FOR MEASUREMENT OF CAPACITIVITY OF
MATERIALS IN LARGE BULK FORM HAVING MOVABLE
SUPPORT AND GUIDE MEANS
Filed March 29, 1962 6 Sheets-Sheet 4

INVENTOR.
WARREN E. BENSON, JR.
BY
Dike, Thompson, Bronstein & Mrose
ATTORNEYS

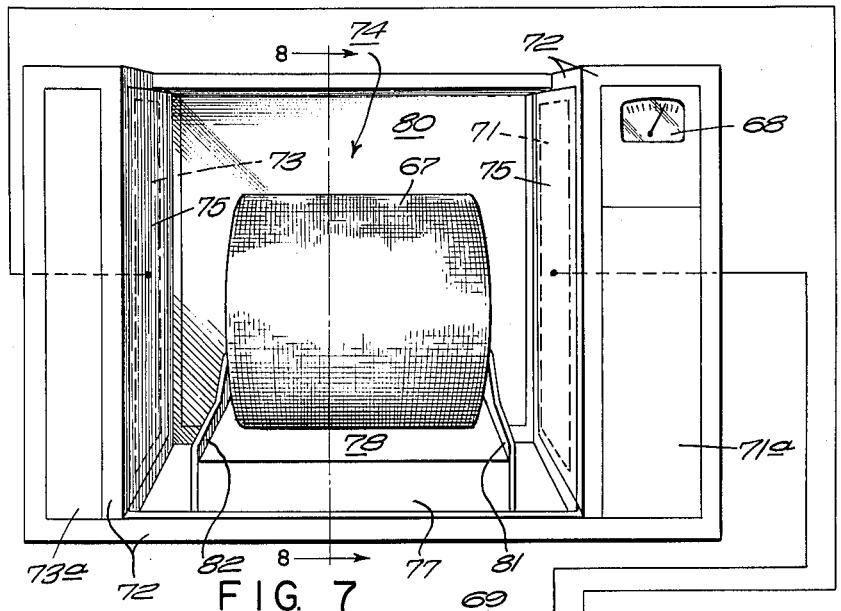
FIG. 7
ELECTRONIC DETECTION EQUIPMENT — TO METER 68
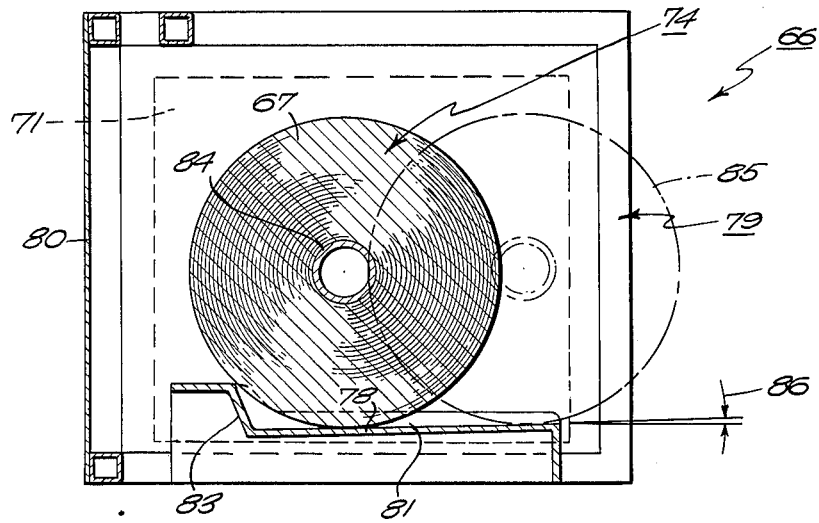
FIG. 8
INVENTOR.
WARREN E. BENSON, JR.
BY
Dike, Thompson, Bronstein & Mrose
ATTORNEYS

United States Patent Office 3,247,455
Patented Apr. 19, 1966

3,247,455
APPARATUS FOR MEASUREMENT OF CAPACITIVITY OF MATERIALS IN LARGE BULK FORM HAVING MOVABLE SUPPORT AND GUIDE MEANS
Warren E. Benson, Jr., Westwood, Mass., assignor, by mesne assignments, to Forte Engineering Corporation, Norwood, Mass., a corporation of Delaware
Filed Mar. 29, 1962, Ser. No. 183,446
11 Claims. (Cl. 324—61)

The present invention relates to improved apparatus for determining the properties of substances by measurement of capacitivities, i.e., their effects upon the capacity of an electrical capacitor, and, in one particular aspect, to novel and improved capacitor test cell apparatus of an open type having movable provisions for orienting measured substances in predetermined measurement sites without disturbance of the measured effects.

Important properties of material, such as their moisture content, dimensions, and composition, are known to be related to their dielectric constants. Based upon this recognition, such properties may be measured very conveniently through use of electronic detection devices associated with and responding to the capacitivities exhibited by capacitive test cells. The swiftness and simplicity of measurement of moisture content in this manner are highly advantageous and are in sharp contrast with the tedious and costly practices of baking and weighing which have long been routine in many industries. By way of example, it has commonly been required that moisture content of materials used in the textile, chemical and foodstuffs industries be established with sufficient accuracy to insure not only that processing and storage characteristics meet certain standards but that the actual yield of the material of interest, as distinguished from associated moisture, be at least within prescribed ranges. When electronic moisture detection equipment is used for these purposes, the associated test cells should, of course, be rendered immune to error insofar as possible, and this suggests that such cells should be relatively small and entirely rigid and should lend themselves to full closure. Dimensional variations and stray fields may thus be suppressed, although at the same time the cells will accommodate only relatively small quantities of the materials being investigated, and there is likelihood of measurement error unless the measured samples have characteristics identical with those of the remainder of the bulk or batch from which they have been taken. In the textile industry, for example, it commonly occurs that samples taken from the exterior or ends of bulk amounts of material have moisture content characteristics which are significantly different from those elsewhere, and, unless one first permits the moisture to distribute itself uniformly through the bulk amount, the sample measurement can be meaningless. On the other hand, the delays involved in allowing moisture to become uniformly distributed throughout a large mass of material can be intolerable in commercial processing operations.

According to the present teachings, however, the difficulties associated with sampling techniques are avoided by measurement of capacitivities exhibited by materials in bulk. The improved test cell apparatus which accepts and performs measurements upon such materials is of appropriately large proportions but is of light-weight and low-cost construction which nevertheless preserves fixed dimensional relationships needed to prevent unintended changes in cell characteristics. Moreover, the major problems connected with orienting bulk amounts of tested materials within large cells are overcome through exploitation of a permanently-open cell design and through unique guide and support mechanisms which, though movable, do not alter the desired field characteristics in the cells.

It is one of the objects of this invention, therefore, to provide novel and improved measurement apparatus which is responsive to capacitivity of materials in bulk form.

A further object is to provide improved capacitivity-measurement cells of low-cost and light-weight open constructions which will readily accept large quantities of measured materials and which will nevertheless preserve substantially fixed electrostatic field characteristics needed for precise measurements.

Another object is to provide novel and improved capacitive test cells for measurement of capacitivity of materials in large bulk form and having movable support and guide provisions which orient the measured materials for optimum measurement without introducing significant error.

By way of a summary account of practice of this invention in one of its aspects, there is provided in an electronic moisture detection system a reference oscillator, the output frequency of which is regulated by the capacitance of a special form of test cell, this capacitance being related to the dielectric characteristics of a large strapped bale of textile material disposed within the electrostatic measurement field of the cell. The cell structure includes two vertical broad-area conductive plates mounted in a spaced parallel relationship on opposite sides of an intermediate measurement region, each of the broad-area plates being in the form of a relatively thin sheet of metal laminated into a rigid electrode unit including a high-strength insulating backing member and a thin overlying sheet of protective insulating material. Each electrode unit is mounted in a rigid metal framework and is separately enclosed and shielded by grounded conductive metal paneling except along the one side which is in confronting relationship to the other electrode unit across the measurement region. Below the lower levels of the two spaced plates are disposed a set of transversely-extending roller shafts suspended in bearings and each carrying wheel-like circular rollers of such a radius that their upper portions project well into the measurement region between the plates, terminating at a common level at which the electrostatic field between the plates is substantially uniform. The rollers are of insulating material and are of such number and proximity to one another that their uppermost peripheral surfaces define a horizontal conveyor plane at which a bale under measurement may be rested and moved horizontally into and out of a centralized optimum measurement site in the cell. Unwanted lateral movements of the heavy bales, which might permit them to impact against and disturb the capacitor plates and the field they create, are prevented by guide lips formed on certain of the rollers. The symmetrical insulating rollers effect no significant disturbance of the cell field when they are at rest during measurement. Access to and egress from the rollers and measurement site are facilitated by openings in the framework, at each end of the roller-type conveyor, and stray fields are minimized by establishing, electrically, a ground potential in the plane about midway between the two capacitor plates. Preferably, the roller assembly is also motor-driven and includes a microswitch control which is actuated by the moving bale to halt the bale in the desired position within the cell automatically.

The subject matter regarded as my invention is particularly pointed out and distinctly claimed in the concluding portion of this specification. However, both as to preferred structure and assembly and further in relation to objects and advantages thereof, this invention may best be understood through reference to the following description taken in connection with the accompanying drawings, wherein:

Figure 2:
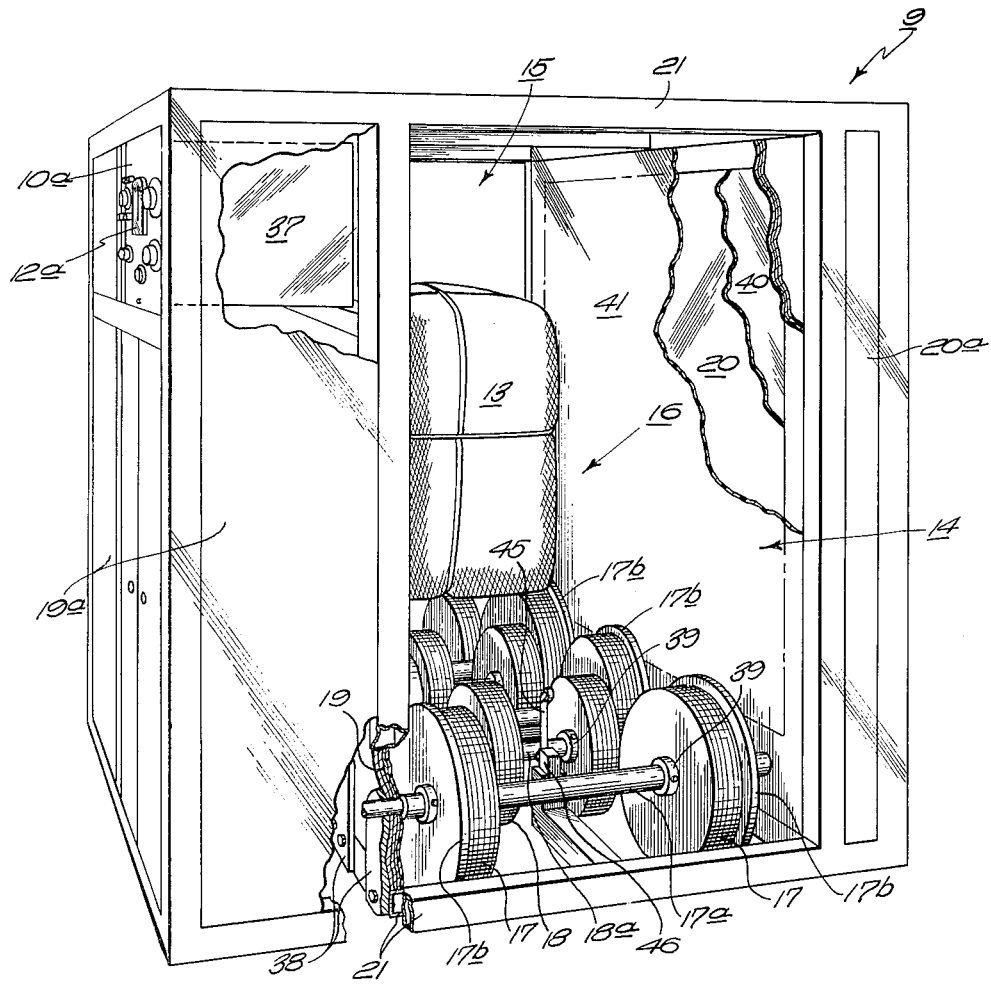
FIGURE 2 is a pictorial representation of a preferred form of test cell such as that depicted in the system of FIGURE 1, the view being taken from the side at which transported bales leave the cell.
Figure 3:
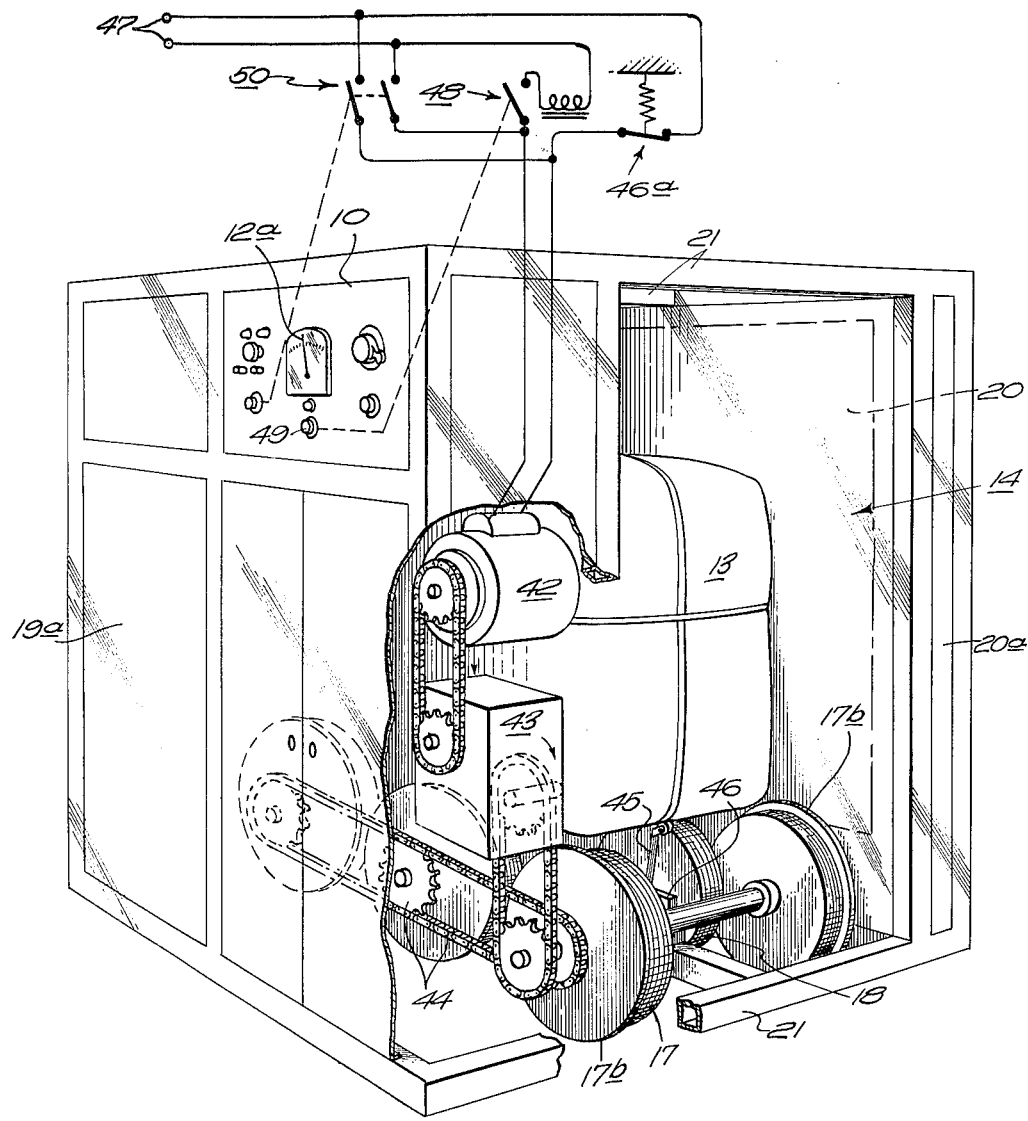
Figure 4:
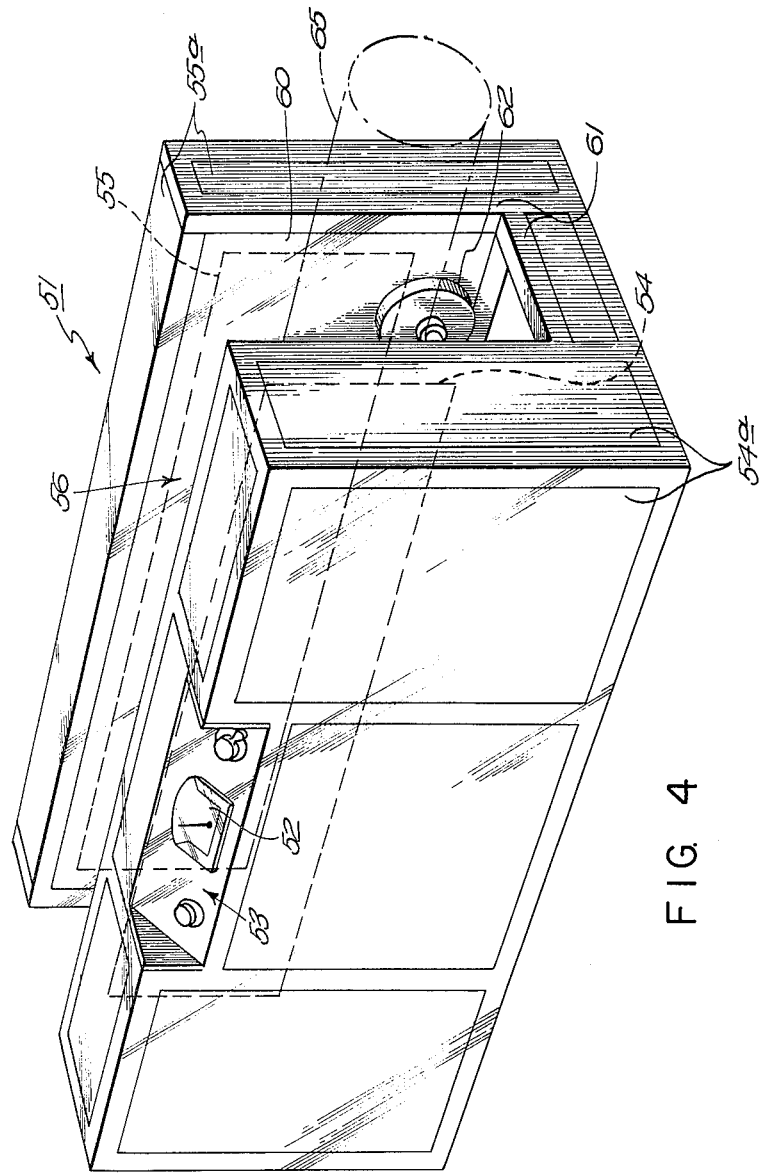
Figure 5:
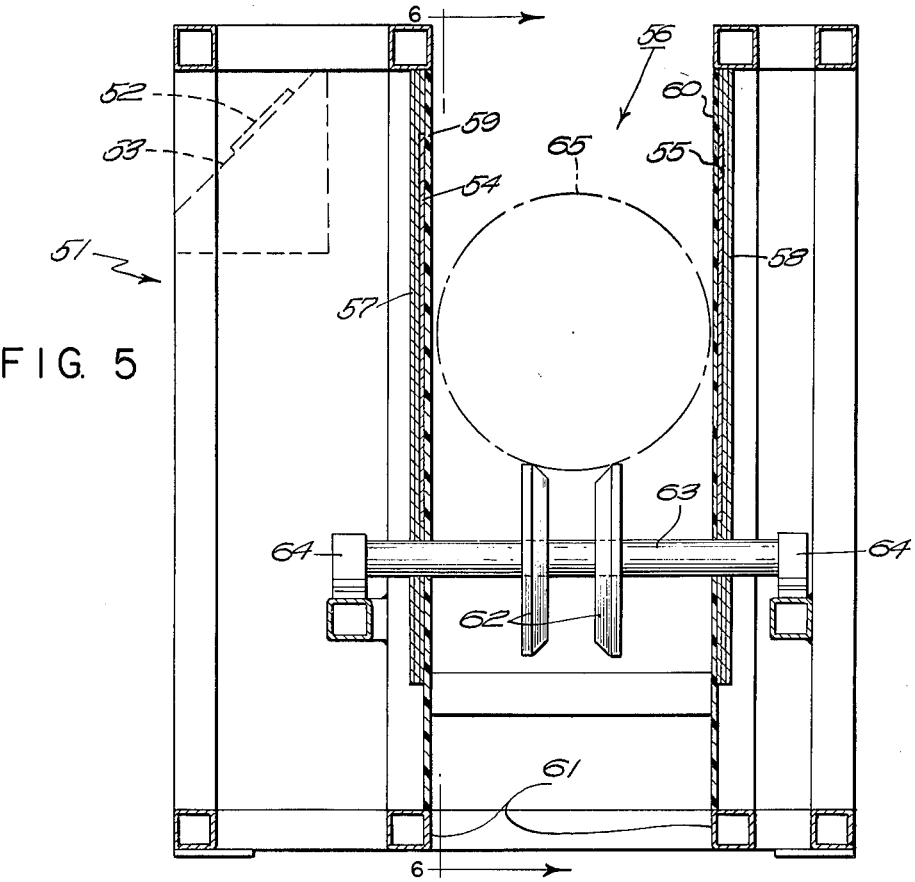
Figure 6:
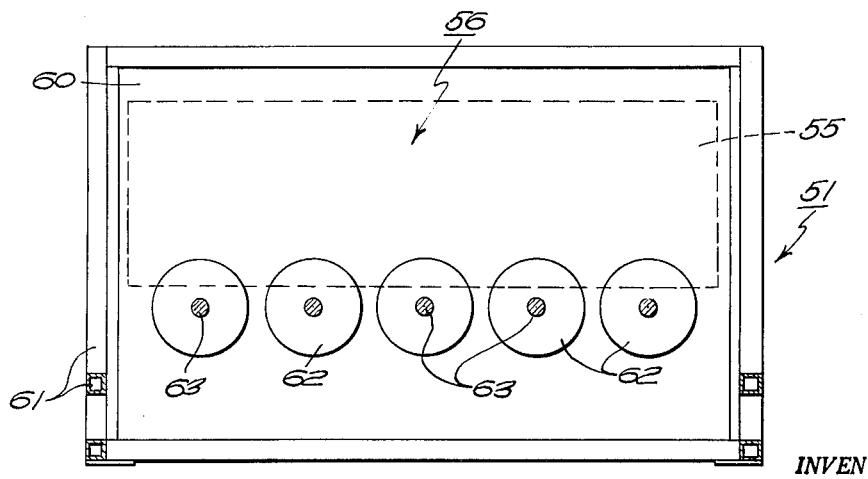

FIGURE 3 provides a further pictorial view of the test cell of FIGURE 2, with portions of the framework and panelling broken away to expose motorized drive mechanisms;

FIGURE 4 depicts an alternative test cell construction designed to accommodate bulk materials in rolled form;

FIGURE 5 is a cross-sectional view of the test cell of FIGURE 4 taken transversely to the capacitor plates;

FIGURE 6 is a cross-sectional view of the alternative test cell taken along section lines 6—6 in FIGURE 5;

FIGURE 7 provides a pictorial view, from the front, of another test cell construction in an electronic capacitivity-measurement system, the cell involving a cooperating spool and locating ramp through which measured materials may be properly oriented by gravitational forces; and FIGURE 8 is a cross-sectional view of the test cell shown in FIGURE 7, taken in a plane parallel with the cell plates.

Figure 1:
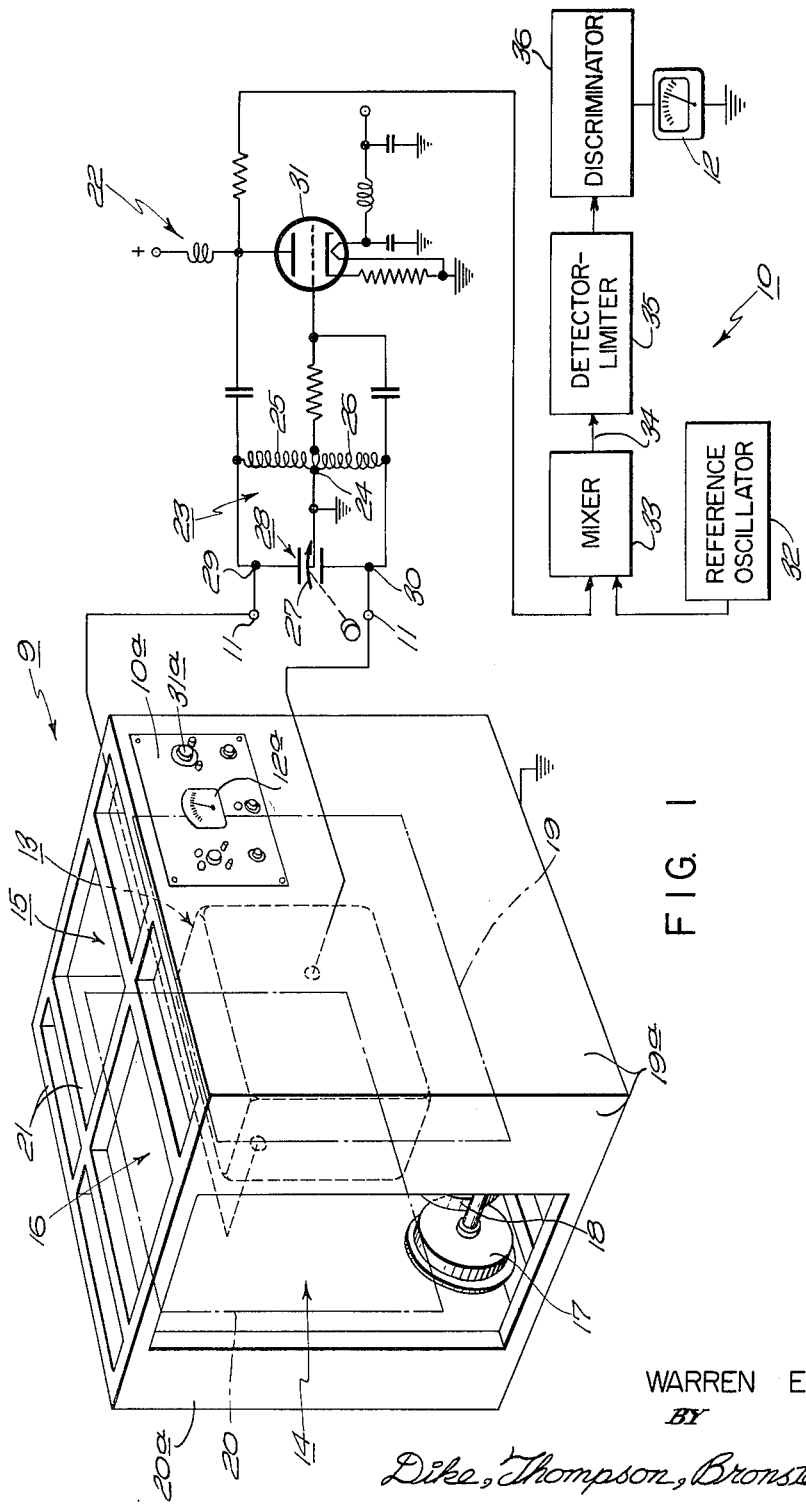
FIGURE 1 illustrates an electronic moisture detection system incorporating an open type of test cell for the handling and measurement of baled materials, various features being portrayed in pictorial, schematic and block-diagram forms.

The embodying equipment represented in FIGURE 1 includes a capacitor test cell apparatus 9 in electrical circuit connection with electronic detection circuitry 10 via the input terminals 11, a direct-reading panel instrument 12 providing visual indications of the capacitivity exhibited by a bulk sample 13 undergoing measurement in the cell. Both the front and rear ends of the test cell structure display permanent openings, 14 and 15, respectively, through which the baled material 13 may be conveniently inserted into and removed from the central measurement space 16, movements of the bale being guided and facilitated by a plurality of rollers such as the two axle-mounted rollers 17 and 18 which are visible in the FIGURE 1 illustration. The two cell electrode plates, 19 and 20, are fixed in vertical parallel spaced relationship, one on each side of the central measurement space 16, and are of like broad areas sufficient to span more than the cross-sectional area of bales received between them. As is described in detail hereinafter, these two electrode plates, while of large area, need not themselves be of massive construction inasmuch as they are back-supported on and overlaid with inexpensive insulating structural panels. Metal box-beam framework 21 supports the electrodes fixedly in predetermined spaced relationship and further provides rugged support for the lower rollers which are part of a bale conveyor and guide arrangement. For the latter purposes the rollers, such as 17 and 18, are formed of insulating material having a low dielectric constant to prevent distortion and absorption of the high-frequency electrostatic field into which they project, it being noted that the capacitor plates 19 and 20 extend below the top level of these rollers, though not to the level of the high-strength metal axles and bearings associated with them. Except for their direct exposures to one another and to the measurement space 16, the two electrode plates are fully enclosed and shielded by grounded metal panelling, 19a and 20a, about the box-beam framework like that marked by reference character 21, such that all stray capacitances associated with the edges and shielded sides of these plates must remain substantially fixed and therefore cannot introduce measurement error. The sole variable capacitance effects which may be experienced are thus found in the regions of the measurement site and the cell openings. Preferably, the electrostatic field within the capacitive test cell should involve wholly parallel flux lines, having a uniform density in distribution, extending perpendicularly to the spaced plates 19 and 20; in practice, this condition is difficult to achieve unless the cell is entirely closed and the spacings of the plates from the side walls is large in relation to the spacings between the plates themselves. Test cell apparatus of the illustrated type intended to accommodate large (400-pound) bales of rayon are necessarily of comparable substantial proportions, although such proportions are nevertheless significantly and advantageously smaller than would otherwise be required were stray fields not suppressed. In this connection, it is noted that the measurement region 16 is exposed and that stray fields would normally tend to reach objects or operators near the end openings 14 and 15 which, for convenience in mechanized handling of measured bales and in performing the measurements, are not provided with the massive doors or movable panels which would be needed to close them. Instead, these unwanted tendencies are suppressed by preserving all of the framework and panelling at a ground potential while at the same time insuring that the instantaneous electrical excitations of the cell plates 19 and 20 are simultaneously of opposite polarity and about equal potential displacements from ground. Under these conditions, the plane intermediate and parallel with the cell plates is preserved at ground potential and the field thereabouts has no tendency to stray or leak to outside objects of about the same potential. The associated electronic detection circuitry 10 is one which provides the needed instantaneously-opposite plate excitations. For this purpose, circuitry 10 includes the variable oscillator 22 which is of a specially balanced type wherein the test cell 9 is part of the frequency-determining tank circuit 23. The latter circuit involves components which are grounded intermediate their ends; in this connection, grounded tap 24 intermediate the two inductance halves 25 and 26 is also interconnected with the intermediate electrode structure 27 of a split-stator balanced variable capacitor 28, such that the opposite ends 29 and 30 of the capacitor 28 are at equal and opposite potentials alternately above and below ground as oscillations are developed in cooperation with the triode 31. The rotor 27 is adjustable by manipulation of a tuning knob 31a. Cell electrodes 19 and 20 are coupled in parallel with the capacitor 28, such that the frequencies of oscillation are regulated by capacitance of the test cell 9 alone when all else in the variable oscillator circuitry is unchanged. Voltage-dividing effects of the grounded center-tapped tank circuit inductance and capacitance units insure that the electrostatic field between cell electrodes 19 and 20 has a potential gradient which crosses ground potential about midway therebetween.

Preferably, the test cell influences upon the variable oscillator frequency are translated into directly-readable indications of meter 12 by mixing of the variable oscillator output with the output of a reference oscillator 32 in mixer 33, the reference oscillator being of such construction and being so influenced by the same environmental conditions that its environment-induced variations in frequency are substantially the same as those of the variable oscillator and desirable self-cancellations occur upon mixing. The combination of the two oscillator outputs yields a component of further output signals, in coupling 34, which is substantially equal to the differences between oscillator frequencies, the differences preferably being within an audio frequency range. Detector-limiter 35 accomplishes a demodulation which results in a signal of frequency substantially equal to the difference in oscillator frequencies, and of constant amplitude irrespective of frequency. The output of detector-limiter 35 is thus found to be in the form of pulses of uniform amplitude and of periodicities corresponding to the differences in output signals generated by oscillators 22 and 32. Discriminator 36, which is preferably of a non-resonant type, is excited by the pulse signal output of detector-limiter 35 to deliver current through meter 12, in the form of an ammeter, which current is also accurately related to the aforesaid frequency differences and the measured capacitivities. Power excitation for the various stages of the system is preferably derived from a known from of regulated power supply, not separately illustrated, to promote system stability. If desired, details of circuitry which may be employed for the block-diagram components of the measurement system may be observed through reference to U.S. Patent No. 3,012,-193 in the name of Stanley Breen for "Apparatus and Method for Measuring Capacitivity of a Material," and further details as to ground-plane type test cell apparatus may be found in the copending application of Stanley Breen for "Measurement of Capacitivity of Materials," Serial No. 830,773, filed July 31, 1959, now U.S. Patent No. 3,028,548, and assigned to the assignee of the subject application.

While the electronic detection apparatus has been separately illustrated in FIGURE 1, as an air to related description, preferred practice involves its mounting on the test cell structure itself, such that the latter serves as a measurement console. Panel 10a represents such support of this apparatus, with the panel and direct-reading instrument, 12a, disposed rearwardly of the broad-area electrode 19. It will be understood also that the electronic circuitry is preferably shielded by grounded panelling, 37 in FIGURE 2, inwardly of the exterior panelling 19a. In FIGURE 2, the construction of test cell 9 is seen to utilize six pairs of wheel-like rollers, such as the rollers 17 and 18, each pair being mounted in spaced relationship upon a separate axle, such as the axles 17a and 18a. To withstand the loading of heavy bales conveyed and mounted by them, the roller axles are preferably formed of metal, preferably steel, as are also the plate-like sleeve bushings 38 secured to the framework to journal these axles near their ends, and the hubs 39 for each of the rollers. However, the rollers themselves are formed of high-strength insulating material having a low dielectric constant; conveniently these are fabricated of laminated wood sheets (plywood). Alternate pairs of rollers, including pairs of rollers 17, are spaced apart such that they will lie near the outer edges of the bottom of a bale of certain size (the hubs being adjustable along the axles for this purpose, with conventional set screws providing the needed locking), and are provided with outer rims 17b of larger diameter than the remainder of the cylindrical rollers. These rims confine the bale 13 to the central part of the measurement space 16, suppressing unwanted canting and also preventing side-to-side movements which could result in impacting of the bale against the side electrode plate structures, the former circumstance being one which causes measurement error and the latter circumstance being undesirable in that the cell plate spacings might then be disturbed. Intermediate sets of rollers, such as rollers 18, are purely cylindrical in form and have the same diameter as the cylindrical portions of the rimmed rollers, whereby all of the rollers define a resting surface for the bale in one plane which is located well within the space between plates 19 and 20 where the electrostatic field is relatively uniform and undisturbed. As may be noted, the rollers are of radius which carries their upper peripheries well above the lower edges of the cell plates 19 and 20, and well above the metal framework, journals, axles and hubs. Consequently, only the low-dielectric-strength material of the rollers appears in the main cell field, and field irregularities and absorptions are minimized.

In the large-size cells under discussion, the dimensions of rectangular conductive electrode plates may be approximately 4½ by 5 feet, and conductive metal plates of this size which are stiff enough to withstand the static loadings and occasional impacts without distortion are necessarily weighty and costly. As is shown in FIGURE 2, however, the cell electrodes 19 and 20 are instead of relatively thin sheet stock, and the desired mechanical stiffness characteristics are imparted by rigid plywood support sheets, such as the plywood support 40, to which the thin sheet electrodes are secured, as by adhesive. The low dielectric constant of these plywood supports also minimizes unwanted absorption of the high-frequency fields. It is also highly important that the electrode structures exhibit an uninterrupted highly smooth surface to the measurement space, such that foreign matter will not adhere and introduce measurement error, and, for this reason as well as for protection the thin electrode plates and to facilitate cell cleaning, the inwardly directed surfaces of the electrode plates and plywood or equivalent supports are faced with a non-conductive plastic sheet, 41, such as Formica, which provides a highly regular and abrasion-resistance surface and possesses a low dielectric constant. The described electrode units, and the welded steel framework for the console-type test cell, provide a secure and rigid assembly which itself preserves substantially fixed electrical capacitance characteristics and thereby avoids introducing measurement error even though bulky and weighty masses of material are being processed.

Because of the bulk and weight of the measured bales, it can be difficult and cumbersome for the operator to load them into the cells and orient them in precisely the position within the measurement space which is optimum for measurement purposes. Accordingly, the insulating roller array is powered to function as a mechanized conveyor, not only aiding in the loading and unloading operations but in automatically halting the strapped bale at the desired position centrally within the cell. For these purposes, at least some of the rollers are driven at relatively slow speed by an electric motor which is under control of both the operator and an automatic control switch. One suitable powering arrangement is represented in FIGURE 3, the electric motor 42 there being coupled in driving relationship to the rimmed rollers 17 through an intermediate speed-reduction unit 43. The illustrated chain-and-sprocket arrangement 44 drives the rollers clockwise, as viewed from the side of the console at which the operator stands in taking measurements, whereby, after initial loading, the strapped bale 13 may be slowly transported from the entrance opening 15 toward the exit opening 14, all the while being centered laterally in the passageway by action of the roller rims 17b. When the transported bale reaches a predetermined position centrally of the cell electrodes, wherein the best field conditions are encountered for measurement, the lower forward edge of the bale trips the spring-biased movable actuating arm 45 of a normally-closed electrical microswitch 46 and thereby interrupts its own forward motion by cutting off excitation of the drive motor 42. At that time, with the bale, rollers, and drive mechanisms at rest, the operator takes a capacitivity reading from meter 12a of the electronic detection apparatus. Thereafter, the motor 42 is reenergized to propel the bale outwardly through the exit opening 14. Preferably, the microswitch 46 is supported below the level of the electrode plates 19 and 20, and its actuating lever 45 is formed of a low-dielectric-strength insulating material, although in any event the disturbances of the cell field are not significant because the microswitch assembly is disposed at about the central ground-potential position. In one practice of these teachings, the motor 42 may be energized from power source terminals 47 by way of a holding switch 48 actuated by a push-button 49 on the console control panel, the normally-closed microswitch, designated schematically by reference character 46a, being connected in a series circuit relationship. Momentary closure of switch 48 energizes the motor to transport a bale inwardly until it actuates the microswitch, whereupon bale movement is halted. Subsequently, the bale may be propelled outwardly by sustained closure of a double-pole push-button switch, 50, which connects motor 42 directly across the supply terminals 47. Other possible circuit connections will be apparent to those skilled in the art. When measurements are being taken, the strapping 13a about the bale 13 is found to be of little effect, particularly where such strapping is of a commercially-available non-metallic type. Metal straps which lie in planes parallel with the electrode plates 19 and 20 do not materially disturb the desired field penetration into the bale. For bales of known weights, the readings of meter 12a represent the percentage moisture content.

In FIGURE 4, the console-type moisture-content measuring system is of large proportions and generally similar to that explained with reference to FIGURES 1–3, except that it is specially adapted to the handling and testing of bulk materials in elongated cylindrical roll form. Textile manufacture commonly involves the winding of finished cloth onto small-diameter cardboard cylinders, to yield a bolt about five feet in length and eight to twenty inches in diameter; such bolts, in right circular cylinder shape, may weight in the range of about 25 to 100 pounds. It is important that the moisture characteristics of the cloth be determined with a high degree of accuracy, inasmuch as the conventional commercial specifications for various types of cloth require that their weight be of a certain value per linear yard. While running yardage is conveniently measured during winding, and total weight may be readily determined by scale weighing of the finished bolt, the actual amounts of dry fiber and water have heretofore been established through costly and time-consuming laboratory sampling techniques involving small strips from the bolt. The latter do not permit rapid and continuous measurement during production, and the manufacturer is thus constantly faced with the risk that much of the plant yield will be produced outside the limits of prescribed specifications before corrective actions may be taken. Moreover, the strip-sampling practices may fail to establish true average moisture content of the entire roll. On the other hand, the apparatus 51 provides immediate and accurate indications of capacitivity, and hence moisture content, of such bolts in their entirety, the measurements being exhibited by the panel-mounted meter 52 of electronic detection equipment 53. Input terminals of the latter equipment, which may be electrically identical with the equipment 10 described in connection with the system of FIGURE 1, are connected with the two parallel broad-area conductive electrode plates 54 and 55 disposed one on each side of the void measurement space 56. Rectangular plates 54 and 55 are each of length in excess of the longest bolts with which the apparatus is to be used, and are of width in excess of the greatest expected diameter of the bolts. These plates are preferably formed of thin flat sheet stock and are supported in a rigid planar condition upon sturdy insulating supports, 57 and 58 respectively in FIGURE 5, which are conveniently made of heavy-gauge plywood, the plates in turn being protectively covered by insulating low-dielectric-constant sheeting 59 and 60, having a smooth abrasion-resistant surface exposed to the measurement space 56. The rigid composite electrode structures are supported in fixed parallel relationship on the console framework of welded square tubing 61, which insures that the critical plate spacing remains constant, and those plate surfaces which are not directed toward the measurement space are shielded by the framework and grounded conductive panelling 54a and 55a to preserve uniform fringing field characteristics.

Cloth bolts are placed in and centered within the measurement space with the aid of five pairs of disk-like non-metallic rollers 62. The latter are formed of high-strength low-dielectric-constant material (such as plywood) which prevents distortion and absorption of the high-frequency cell field into which they project from their mountings on metal axles 63 and frame-supported bearings 64 disposed below the lower level of the plates 54 and 55. As is evident from the cross-sections in FIGURES 5 and 6, the rollers 62 are of about the same diameter and their upper peripheral portions lie at about the same level well into the measurement region between the plates, where the electrostatic field will be substantially uniform. The lateral separation between rollers of each pair is sufficiently smaller than the smallest diameter of the bolts of cloth which are to be measured to provide a centered support for them between the plates at an elevated position within the uniform field. Larger-diameter bolts, such as that the outline of which is designated by reference character 65, are also laterally centered by the spaced rollers. Preferably, the adjacent peripheral edges 62a of the rollers in each pair are tapered, as shown in FIGURE 5, to promote lateral centering of the bolts. In performing measurements, a weighed bolt of cloth is inserted into the central opening of the U-shaped test cell, from one side, atop the pairs of rollers, and is rolled forward until centered longitudinally between the electrodes. Thereafter, with the bolt and rollers stationary, a meter reading is taken and is known to be related to the moisture content for that weight of bolt. As in the case of the embodiment of FIGURES 1–3, the positions at which the rollers are at rest during any measurement are not critical, inasmuch as the rollers are wholly symmetrical about their axes of rotation and always have about the same predetermined effect upon cell capacitivity.

The apparatus 66 of FIGURES 7 and 8 is likewise utilized for the measurement of capacitivity of bulk materials in roll form, particularly rolls of cotton or rayon gauze. Such materials are most often commercialized on a poundage basis, and the manufacturer is obliged to preserve moisture levels within allowed limits. Gauze of the type intended to be measured swiftly by apparatus 66 in the course of production is commonly wound in large finished rolls having diameters up to about 40 inches and weighing in the range of about 250–400 pounds. Moisture content evaluations have heretofore been made in the labortory (utilizing baking and weighing techniques) upon small samples which comprise strips torn from the ends of production rolls. The strip sample of gauze material is so thin that it quickly reaches a moisture content level determined by the temperature and relative humidity of the winding room, while the balance of the material, wound at high speeds, can have a significantly different percentage moisture content. It thus occurs that the differences in exposure of the sample vs. the entire roll, and the percentage moisture changes developed during rolling and storage, can render the sampling techniques almost worthless as a practical and accurate means for determining final roll moisture content. Yet, knowledge of the respective percentages of dry fiber and water in such rolls is highly important to the producer, and should be determinable rapidly if it is to aid in production control and in determining plant yield. Utilizing the console-type apparatus of FIGURES 7 and 8, the sampling practices are dispensed with entirely and the finished production roll, 67 is itself measured as a whole to provide an immediate direct reading of capacitivity, on meter 68, which is related to percentage moisture content for that weight of roll. The electronic detection equipment 69 used in this apparatus is preferably of the same type described with reference to the system of FIGURE 1, and in practice is preferably disposed within grounded shielding rearwardly of the panel 70 and within the grounded enclosure formed by conductive panelling 71a on the rigid console framework composed of welded square steel tubing 72. Panelling 71a aids in enclosing one of the two electrode plates, 71 and 73, except along its broad-area face exposed to the central open measurement region 74, and panelling 73a serves a like function in relation to the opposite parallel electrode plate, such that the fields other than those directly between the two plates and through the measurement region always tend to remain advantageously unchanged. Within the measurement region 74, the measurement field is desirably substantially uniform inwardly of the edges of the two plates, and the instantaneous field potential level about midway between these plates is also preserved at substantially ground potential to minimize stray and fringing fields from the site of the open measurement region. As in the case of the constructions described earlier herein, the conductive metal electrode plates 71 and 73 are advantageously formed from thin sheet stock, with rigidity and uniformly planar conditions being preserved by a laminated insulating support sheet (preferably plywood) and with smooth abrasion-resistant surfaces being provided by overlying insulating low-dielectric laminated sheets 75 and 76. Accurate location of the measured roll within the preferred uniform-field site in the measurement field is highly important to accurate measurement of moisture content. For the latter purposes, the console unit is provided with a guiding and holding platform unit 77, fabricated from an insulating low-dielectric-constant material such as plywood, which does not tend to distort or unduly absorb and dissipate the high-frequency cell field. Unit 77 provides a planar ramp surface 78, which is downwardly inclined slightly in direction from the front opening 79 to the panel-enclosed rear 80 of the test cell, which is bordered at its sides by rails 81 and 82 projecting above it, and which is terminated at its rear end by an upwardly-inclined stop 83. The hollow central insulating spindle (cardboard or the like), 84, on which the gauze is wound is of circular symmetry about its longitudinal axis and is of relatively small diameter, although the finished roll 67 is of a very much greater diameter (ex. 40 inches) and is of right circular cylinder form enabling it to function as a substantially rigid roll in guiding itself automatically into the illustrated centered position after once being placed upon the ramp 78 near its front edge (dashed-line illustration 85 in FIGURE 8). Alternatively, the gauze may be wound upon an insulating spool, including disk-like ends functioning as rollers, and, in either event, the finished gauze roll is wholly symmetrical about its longitudinal axis, such that gravity may deliver the wound roll into the stopped position with any random angular orientation without danger that significant measurement errors will be involved. Preferably, the inclined ramp surface itself is disposed at a level above the lower edges of the electrode plates 71 and 73, such that the wound material is oriented well within the site of the uniform measurement field. Guide rails 81 and 82 and rear stop 83 insure that each measured roll is self-oriented to about the preferred position for testing in the cell, and the small angle of incline, 88, of the ramp insures that the massive rolls will not impact too strongly against the rear stop and may be withdrawn easily following measurement.

The test cell configurations may of course be varied to meet requirements and convenience in the testing of materials of shape and consistency different from those referred to. Similarly, the electronic detection circuitry employed in some practices of these teachings may assume forms other than as described. Accordingly, while preferred embodiments of this invention have been shown and described herein, those skilled in the art will recognize that various changes, modifications and substitutions may be effected without departing either in spirit or scope from the invention in its broader aspects as set forth in the appended claims.

What I claim as new and desire to secure by Letters Patent of the United States is:

1. Capacitor test cell apparatus responsive to capacitivity of a substance in bulk form and adapted to be coupled into an electrical measurement system, comprising a pair of broad-area capacitor electrodes, means mounting said electrodes in insulated relationship with a hollow measurement region therebetween for accommodating quantities of said substances in bulk form, grounded shielding material in enclosing and insulated relationship to said electrodes, said shielding material and mounting means being disposed peripherally beyond the extremities of an opening which exposes said measurement region between said electrodes for access from outside said test cell apparatus, insulating support means having substantially circular symmetry about an axis of rotation for supporting a substance in bulk form, means positioning said support means for rotation at least partly within the electrostatic field between said electrodes with said axis of rotation substantially aligned with lines of electrostatic flux between said electrodes and at a position wherein said support means supports a substance in bulk form thereon wholly within the electrostatic field in said measurement region, and means fixed in a relationship to said electrodes for rolling the bulk substance into said measurement region through the opening and thereby producing rotation of said insulating support means at least partly within the electrostatic field in said measurement region between said electrodes, whereby different angular orientations of said insulating means about said axis of rotation do not affect the measurement field pattern between said electrodes.

2. Capacitor test cell apparatus responsive to capacitivity of substances in bulk form and adapted to be coupled into an electrical measurement system, comprising a pair of broad-area capacitor plates having substantially planar surfaces disposed in spaced insulated parallel relationship facing a hollow measurement region therebetween for accommodating the bulk substances to be measured, electrically-conductive grounded enclosure means surrounding and shielding the surfaces of each of said plates other than said surfaces facing said measurement region, said enclosure means being disposed peripherally beyond at least one opening permanently exposing said measurement region to receive the bulk substances therethrough from outside the test cell apparatus, electrical circuit means responsive to the capacitance between said plates and producing at said plates instantaneous potentials which are simultaneously of opposite polarities in relation to ground potential, insulating roller means of material having a low dielectric constant and having substantially circular symmetry about an axis of rotation thereof for supporting the bulk substances thereon, and means supporting said roller means for rotation with said axis extending substantially in the direction of lines of electrostatic flux between said plates and with said roller means at least intercepting the field flux and projecting into part in said measurement region for a predetermined distance at which bulk substances transported thereon into the central part of said measurement region lie wholly within the electrostatic field between said plates.

3. Capacitor test cell apparatus as set forth in claim 2 wherein said capacitor plates are disposed substantially vertically and said opening permanently exposes said measurement region along at least one of the two sides thereof between said plates, wherein said roller means comprises at least one pair of spaced collinear insulating disk members, and wherein said supporting means orients the axis of rotation of said spaced disk members substantially horizontally and perpendicular to said capacitor plates.

4. Capacitor test cell apparatus as set forth in claim 3 wherein said capacitor plates are substantially rectangular and the lower edges thereof are substantially horizontal, and wherein said supporting means comprises a shaft mounting said disk members about the centers thereof, said shaft being disposed below the lower edges of said plates with the upper portions of said disk members projecting into the electrostatic field in said measurement region.

5. Capacitor test cell apparatus as set forth in claim 4 wherein said roller means comprises a plurality of pairs of spaced collinear insulating disk members of substantially the same diameter, and wherein said supporting means comprises a plurality of shafts each mounting a different pair of the spaced disk members for rotation about the centers thereof, said shafts being disposed at the same level below the lower edges of said plates with the upper portions of said disk members projecting into said measurement region, whereby said disk members cooperate to transport and support the bulk substances to be measured at a level within said measurement region wherein the bulk substances lie wholly within the electrostatic field between said plates.

6. Capacitor test cell apparatus responsive to capacitivity of substances for measurement of moisture content of the substances in bulk form, comprising a pair of substantially rectangular planar capacitor plates each having a surface area greater than the cross-sectional area of the bulk substances to be measured by said apparatus, a rigid grounded metal framework supporting said plates vertically in insulated spaced parallel relationship each facing a hollow measurement region therebetween and with the lower edges of said plates substantially horizontal, grounded metal panelling affixed to said framework in shielding and enclosing relationship to the surfaces of said plates which do not face said measurement region, said framework and panelling being disposed peripherally beyond at least one opening in the vicinity of said measurement region exposing said region to permit the bulk substances to be inserted into and withdrawn from said measurement region between said plates, a plurality of rollers of insulating material each having circular symmetry about an axis of rotation for supporting the bulk substances to be measured, said rollers being of substantially the same diameter, means mounting said rollers in said framework with the axes of rotation thereof substantially horizontal and perpendicular to said plates, said mounting means being disposed below the lower edges of said plates and orienting the upper portions of all of said rollers within said measurement region and within the electrostatic field between said plates in close proximity which permits the bulk substances to be supported atop said rollers and rolled into said measurement region and wholly within the electrostatic field between said plates on said rollers, and electrical circuit means responsive to the capacitance between said plates and producing at said plates instantaneous potentials which are simultaneously of opposite polarities in relation to ground potential.

7. Capacitor test cell apparatus for measurement of moisture content as set forth in claim 6 wherein said rollers comprise disk-shaped members, wherein said mounting means comprises a plurality of metal shafts each supporting a pair of said disk-shaped members in axially-spaced relationship, and wherein said shafts are disposed in spaced parallel and horizontal relationship below the lower edges of said plates to form a linear conveyor including a plurality of pairs of said disk-shaped members extending from one to the opposite opened side of the framework.

8. Capacitor test cell apparatus for measurement of moisture content as set forth in claim 7 further comprising electric motor means for rotating at least certain ones of said rollers, whereby to power movement of the bulk substances atop said rollers from said one to said opposite opened side of said framework, and further comprising means for interrupting the rotation of said rollers by said electric motor means to halt the rollers and bulk substances carried thereby while the bulk substances are wholly within the electrostatic field between said plates and while said electrical circuit means responds to the capacitivity exhibited between said plates.

9. Capacitor test cell apparatus for measurement of moisture content as set forth in claim 7 wherein a plurality of said disk-shaped members include radially-enlarged rims on their sides nearer the adjacent capacitor plates, said rims adjacent each of said plates being aligned with one another substantially parallel to and spaced from said plates, whereby said rims urge the bulk substances carried on said disk-shaped members centrally of the measurement region.

10. Capacitor test cell apparatus responsive to capacitivity of substances for measurement of moisture content of a substance in bulk form, comprising a pair of broad-area capacitor electrodes each including a thin and flexible conductive metal sheet affixed to a different rigid insulating planar sheet of greater area and of material having a relatively low dielectric constant, a rigid grounded metal framework supporting the rigid insulating sheets of material in spaced parallel relationship with the conductive metal sheets thereon facing a hollow measurement region therebetween, grounded metal panelling affixed to said framework in shielding and enclosing relationship to the surfaces of said metal sheets which do not face said measurement region, said framework and panelling being disposed peripherally beyond at least one opening in the vicinity of said measurement region exposing said region to permit the bulk substance to be inserted into and withdrawn from said measurement region between said electrodes, insulating support means having substantially circular symmetry about an axis of rotation for supporting the substance in bulk form thereon, means positioning said insulating support means for rotation with said axis extending in the direction of lines of electrostatic flux between said electrodes and with said insulating support means at least in part intercepting the electrostatic flux, and means fixed in relationship to said electrodes for rolling the bulk substance into said measurement region through the opening and thereby producing rotation of said insulating support means at least partly within the electrostatic field flux in said measurement region between said electrodes.

11. Capacitor test cell apparatus as set forth in claim 10 wherein each of said electrodes further includes a sheet of insulating material of said greater area having a relatively low dielectric constant overlying the conductive metal sheet and rigid insulating planar sheet and exhibiting a smooth abrasion-resistant surface to said measurement region, and wherein said rigid insulating planar sheet of each of said electrodes comprises a plywood sheet.

References Cited by the Examiner

UNITED STATES PATENTS

| | | | |
|---|---|---|---|
| 1,586,111 | 5/1926 | Osborn. | |
| 1,745,784 | 2/1930 | Davis | 211—126 X |
| 2,094,950 | 10/1937 | Kohler | 193—37 |
| 2,468,827 | 5/1949 | Kennedy et al. | 131—121 |
| 2,527,208 | 10/1950 | Berry et al. | 73—73 |
| 2,945,165 | 7/1960 | Franzel | 317—246 |
| 2,976,981 | 3/1961 | Peras | 198—127 |
| 2,982,895 | 5/1961 | Exon | 317—246 |
| 3,028,548 | 4/1962 | Breen | 324—61 |
| 3,077,770 | 2/1963 | Burk | 73—73 |

FOREIGN PATENTS 827,004  1/1960  Great Britain.

WALTER L. CARLSON, *Primary Examiner.*

J. P. O'BRIEN, E. E. KUBASIEWICZ,
*Assistant Examiners.*